March 27, 1962 K. H. MAIER 3,026,571
METHOD OF CONTINUOUS MANUFACTURE OF
MEMBRANE FILTERS
Filed Oct. 23, 1958
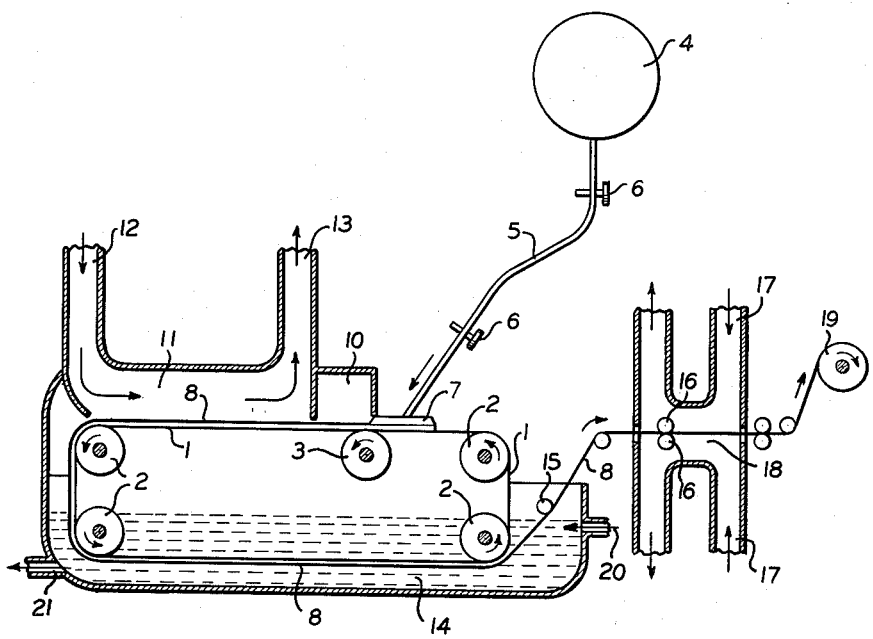
INVENTOR
KARL HEINRICH MAIER
ATTORNEY 3,026,571
METHOD OF CONTINUOUS MANUFACTURE OF MEMBRANE FILTERS Karl Heinrich Maier, Gottingen, Germany, assignor, by mesne assignments, to Membranfiltergesellschaft G.m.b.H., Gottingen, Germany, a corporation of Germany
Filed Oct. 23, 1958, Ser. No. 769,978
Claims priority, application Germany July 4, 1956
6 Claims. (Cl. 18—57)

The present invention relates to a method of and apparatus for the continuous manufacture of membrane filters.

Membrane filters are microporous filters of a high degree of fineness which are suitable for filtering of microorganisms or similar fine grained material in a filtering process.

This is a continuation-in-part application of the copending application Ser. No. 634,588, filed January 16, 1957, now abandoned.

It is known that such membranes may be produced from solutions of cellulose esters, particularly of cellulose nitrate and cellulose acetate in volatile organic solvents. In order to achieve this end a viscous solution of cellulose ester is poured or drawn on plain glass plates in form of a layer, so that the glass plates are covered with a viscous film, the thickness of which may be predetermined by providing a weir. In this process the solution is fed into a so-called draw slide, one wall of which is formed as a thin weir and upon drawing of the slide the liquid film is equally distributed in the form of a strip over the glass plate. After the liquid film is applied, the solvent mixture is evaporated, whereby, a solidification of the liquid film to a dry foil having artificial material-like characteristics and simultaneously of fine porous structure is brought about.

It is already known in the manufacture of membranes not to use pure solvents, but mixtures of esters, ketones or ether on the one hand and low alcohols, as ethyl alcohol, butyl alcohol and amyl alcohol on the other hand. The composition of the mixtures, sometimes also with addition of glycerine or small quantities of water, determines substantially the degree of fineness of the formed membrane film. In this connection there is a distinction between solvents of a first order which have the characteristic of a solvent (ester, etc.) for cellulose ester and solvents of a second order (alcohols) which have the characteristic of a precipitant for cellulose ester. During the evaporation a shift of the relation of the two solvents in favor of the precipitant takes place, which leads to the gelation and later following solidification of the membrane. Thus this used clean evaporation process has the drawback that a comparatively long time is required in order to evaporate all materials capable of evaporation out of the membrane film and for this reason a continuous manufacturing process is not possible. Furthermore, the machinery for performing this known process requires an unusually large space, since the glass plates carrying the film are exposed for 8 to 12 hours, as has been established by experience. A shortening of the process by preliminary solution of the membranes is not feasible, since the remainder of the solution ingredients would lead to later shrinking and fold formations, which exclude the later use of the final product as a filter.

It is, therefore, one object of the present invention to provide a method for the continuous manufacture of membrane filters which eliminates the drawbacks inherent in the long development time of the membrane in the old processes.

It is still another object of the present invention to provide a method of the continuous manufacture of membrane filters in which the time required for the formation of the film is decidedly shortened by removal of the solution ingredients in such manner that this removal step is divided into two phases. In the first phase the light volatile solvent (solvents of the first order) evaporates at a temperature within a range of 20° to 40° C. and at a relative humidity of 50% to 70% and in the second phase the heavier volatile solvent ingredients (solvents of the second order) are removed by means of diffusion in a liquid bath of a temperature within a range of 20° to 40° C. from the membrane. It has been found that in this manner the time for removal of all solvents and softener additions may be reduced from a plurality of hours to a plurality of minutes.

Liquids are suitable as liquid baths which have the characteristic of a precipitant for the membrane mass and which are simultaneously mixable without limitation with the solvents of the second order as ethyl alcohol, butyl alcohol and glycerine. Water or water solutions of alcohols or esters may be used advantageously for this purpose.

The following examples are given therefor:
(1) Distilled water at a temperature of 35° C.; and
(2) A 2% water solution of glycerine at a temperature of 35° C.

The evaporation of the light volatile solvents may be appreciably accelerated by airing combined with the selection of the most suitable climate. Also the diffusion of the heavier volatile solution ingredients from the membrane in a liquid bath may be controlled by using the well known reverse current principle in such manner that the diffusion difference is always at its optimum. Due to the combination of these two measures is it possible to reduce the time required for the membrane formation to a degree that a continuous manufacturing process is made.

The following two examples are given as solutions for the layer, which are suitable in accordance with the present invention:

(1) In order to form the solution for the layer 3 kg. of marketed cellulose nitrate of a quality suitable for highly viscous solutions with a content of 33% ethyl alcohol is dissolved by stirring in the following mixture:

22 l. methyl acetate
10 l. ethyl alcohol
5 l. butanol

There is made an addition to this solution of—

0.7 l. glycerine
0.8 l. distilled water

After standing for a period of 24 hours for removal of the air bubbles, the viscous solution is ready for use.

(2) 2.4 kg. cellulose nitrate, of the same quality, as disclosed in Example 1, with a content of alcohol of 33% and 0.4 kg. of marketed cellulose acetate which is air-dry are dissolved in the same mixture stated above in connection with Example 1 by means of stirring. There is added to this solution:

1 l. glycerine
1 l. water.

With these and other objects in view which will become apparent in the following detailed description, the present invention will be clearly understood in connection with the accompanying drawing, in which the only figure is a diagrammatic showing of the apparatus for performing the method in accordance with the present invention.

The apparatus, which is shown in the drawing by example only, comprises a storage container 4 from which the layer solution is fed through a conduit 5 controlled by a control valve 6 into the layer weir 7. The solution is then fed from the latter through a slot onto the endless ribbon 1 which runs over the return rollers 2 and a supporting roller 3. The solution 8 which has been applied to the ribbon 1 passes at first the preliminary chamber 10 and then into the airing chamber 11 in which the pregelation step takes place. An air stream passes through the airing chamber 11, which air stream enters at the opening 12 and leaves at the opening 13 with simultaneous removal of the light volatile solvent. The ribbon 1, which carries now the membrane in its pre-gelation state is then fed into a diffusion bath container 14 over the return rollers which bath is supplied at the opening 20 of the container 14 and which leaves the container 14 at the opening 21 and thus receives continually fresh bath liquid. The finally developed moist membrane 9 is then fed to a removal drum 15 and over turning rollers and then over heating drums 16 and finally passed through a drying channel 18. The removal drum 15 serves the purpose to remove the moist membrane film from the endless band.

The drying channel 18 receives hot air by provision of an airing system 17 which hot air strikes over the membrane on both sides thereof. After passing the drying channel 18 the finished membrane film is wound on a drum 19.

In addition to the mechanical means for removal of the moist membrane film from the endless ribbon 1, as the removal drum 15, chemical means may be provided also. Such chemical means may be softeners, removers or separating oils, which may be used selectively for treatment of the bath liquid, the solution of the layer or the surface of the endless band.

For the chemical additions to the bath liquid, the above stated solutions for the diffusion bath are sent through the bath by using the reverse stream principle. Advantageously the content of the container 14 receiving about 3.5 m.³ of liquid is changed within a period of 4 hours. The flow through the container is properly controlled and adjusted by conventional flow meters. Simultaneously it is possible by use of water with additions of alcohols or esters to control and to adjust the amount of the additions by means of flow meters or known dosage devices.

As an example it may be stated that if a flow of 15 l. of water takes place per minute, an addition of 0.3 l. of glycerine is made per minute. It is also possible to provide an addition of 1 l. of methyl alcohol per minute in case of a flow of 15 l. of water per minute.

The layer solution may be treated by example in the following manner in order to remove the layer from the endless band:

In the above mentioned layer solutions of pure cellulose nitrate or mixtures of cellulose nitrate and cellulose acetate, the glycerine addition is increased from 0.7 l. to 1.5 l. in the first example and from 1 kg. to 2 kg. in the second example.

Finally, in order to bring about the removal of the layer, the surface of the endless band may be treated by chemical means.

In order to increase the capacity of removal, a thin layer of separating oil (silicone oil) is continuously applied. For this purpose, a sponge or a felt drum (not shown), soaked with separating oil, may be provided adjacent the layer weir 7.

It has been set forth above that the composition of the mixtures determines the degree or the porosity of the membrane filter in combination with the temperature and relative humidity ranges applied during the forming process.

The factors which are to be considered in the composition of the solution are of colloidal chemical nature, while the temperature and relative humidity ranges are climatically effective factors. In considering the colloidal chemical factors, not only the combination of the different solvents, but also the characteristics of the used solid materials, which are in the present case the cellulose esters, must be considered.

Practically, nearly exclusively cellulose nitrates and cellulose acetates are used in the manufacture of membranes, since these cellulose ester types are available in sufficient quantities as economical raw material. Preferably ester-soluble nitro wool, which corresponds with the nitro wools "E1440 to E730" marketed in Germany by Wolff & Co., Walsrode, Germany or equivalent products of German or foreign manufacture are used. The products "E1440 to E730" correspond closely with the types "RS250 to 400 sec.," to "RS 5–6 sec." of Hercules Powder. These products, which differ from each other by their different degrees of polymerization and different viscosities, may be used in the manufacture of membrane filters alone or in mixtures with other products.

As an example for the mixture of wools of different degrees of polymerization, the manufacture of very coarse porous membrane filters for air filtration is given. In this case, a nitro wool of the type "E1250" is admixed with a nitro wool "E730" with a proportion of 2:1, in order to achieve a higher content of solid material and, thereby, to bring about a better mechanical rigidity of the very loosely formed membrane filter.

The used layer solution has by example the following composition:

| | Percent |
|---|---|
| Cellulose nitrate "E1250" | 4 |
| Cellulose nitrate "E730" | 2 |
| Methyl acetate | 53 |
| Methyl alcohol | 24 |
| Butyl alcohol | 12 |
| Water | 3.7 |
| Glycerin | 1.3 |

A membrane filter is obtained with this solution the air penetration of which is 6 liters of air/cm.²/min./500 mm. of water-column. The median pore width is 5–10$\mu$.

As technically suitable acetates, commercially available cellulose acetates, as "Cellit" of the type "L1200 to L900," marketed by Farbenfabriken Bayer, Leverkusen, having a content of 63% of acetic acid, may be used. These cellulose esters may be used alone or in mixtures, thus as cellulose nitrate or cellulose acetate alone, as well as such nitrate-acetate mixtures, in order to produce relatively porous and well working membrane filters. The examples set forth above apply in this case.

Example I for cellulose nitrate alone:
   3 kg. cellulose nitrate having a content of 33% ethyl alcohol
   22 l. methyl acetate
   10 l. ethyl alcohol
   5 l. butyl alcohol
   0.7 l. glycerin
   0.8 l. distilled water Example II for the mixture of cellulose nitrate with cellulose acetate:
   2.4 kg. cellulose nitrate having a content of ethyl alcohol of 33%
   0.4 kg. cellulose acetate, air dry
   22 l. methyl acetate
   10 l. ethyl alcohol
   5 l. butyl alcohol
   1 kg. glycerin
   1 l. water Example III for cellulose acetate alone:
   2.8 kg. cellulose acetate
   40 l. methyl acetate
   20 l. isobutyl alcohol
   0.6 l. glycerin If the layer solutions given in the Examples I to III are used, membrane filters of the type for bacteria filter having a median pore width of about 0.5 micron are achieved.

The concentration of the solid material content (cellulose ester) is determined by the gelation behavior and the viscosity of the solution. These two factors limit the technical possibilities for the prototype for the production of the membrane filter "E1250" to a concentration range of about 3% to about 15%. If a percentage below said range is used, no continuous gelatine can be achieved. Solutions having a concentration of more than 15% do not lend themselves for use as a layer due to their extreme toughness and do not provide an even surface. Technically particularly favorable characteristics are found in layer solutions having a percentage of 5% to 6% cellulose nitrate.

Reference is made above to the different types of solvents, namely solvents of the first order and of the second order. The former are known in the manufacture of lacquer as real solvents for nitro wools, while the latter are known as so-called swelling means for nitro cellulose. As solvents of the first order have been named by example esters, ketones and ether. Suitable solvents for nitro wools in particular are methyl acetate, ethyl acetate, amyl acetate, acetone, methyl-ethyl ketone, and others. These solvents are exchangeable among each other within far limits. It is merely necessary to provide the condition that they are good solvents for cellulose ester and evaporate easily.

The same solvents cited for cellulose nitrate are likewise applicable for cellulose acetate, and for the latter may be added methylen chloride, particularly in mixtures with butyl alcohol or ethyl alcohol as good solvents.

As solvents of the second order may be particularly cited ethyl alcohol, butyl alcohol and amyl alcohol. If cellulose acetates are used, in addition also isobutyl alcohol has been found suitable.

In the latter case the following example is given:

2.8 kg. Cellit L1000
36 l. methylene chloride
4 l. butyl alcohol
20 l. isobutyl alcohol
0.6 l. glycerin The relation of quantities of solvents of the first order and solvents of the second order is generally 3:2. By changing this relation, a gradual change of the fineness of the membrane filter may be brought about. The following example is given on that point.

In using the basic composition of the layer solution according to Example I, by changing the solvent components the following effect may be achieved:

| Relation of solvent of the first order to solvent of the second order | filtration time in sec. | median pore diameter in $\mu$ |
|---|---|---|
| 3:2 | 25 | 0.6 |
| 3:1 | 60 | 0.4 |

The given filtration time relates to a usable filter area of 12.5 cm.$^2$, a quantity of water of 0.5 l, with a pressure difference of 70 cm. Hg.

If now the relation of the solvents of the first and second orders is changed to the extent that only solvents of the first order are contained in the mixture, glass-clear filters are achieved, which do not permit any penetration, and where practically no porosity can be shown.

If the addition of solvents of the second order operates the formation of a certain porosity and retains loosely the formed gelatinous membrane, an addition of water as precipitant for cellulose nitrate has a particularly drastic effect.

In order to demonstrate the influence of the water content on the solvent, the following examples are given:

(a) Membrane filter AF for air filtration:  Percent
Cellulose nitrate _____ 6
Methyl acetate _____ 53
Ethyl alcohol _____ 24
Butyl alcohol _____ 12
Glycerin _____ 1.3
Water _____ 3.7
Medial pore diameter about 5–10 microns.

(b) Membrane filter "coarse":
Cellulose nitrate _____ 5.5
Methyl acetate _____ 58.1
Alcohol _____ 21.8
Butyl alcohol _____ 11.6
Glycerin _____ 2.4
Water _____ 0.6
Median pore diameter about 0.4 micron.

(c) Membrane filter "median":
Cellulose nitrate _____ 5.94
Methyl acetate _____ 58.1
Ethyl alcohol _____ 21.8
Butyl alcohol _____ 11.6
Glycerin _____ 2.4
Water _____ 0.16
Median pore diameter about 0.25 micron.

(d) Membrane filter "fine":
The same ingredients as in (c), however no water addition. Median pore diameter about 0.15 micron. If cellulose acetates are used, the water addition has the following effect:

| Water addition in percent | Median pore diameter in $\mu$ |
|---|---|
| 0 | 0.6 |
| 1.5 | 0.4 |
| 3 | 0.12 |

Compared with the decisive effect caused by the change of the composition of the solvent, the influence of the climatic factors is gradual only. As a general rule, it may be stated that in order to achieve a fine structure a low humidity within the range of 50–60% is to be used, while in order to achieve coarser structures a higher humidity of 60–70% is to be used.

The following example indicates the effect of a varied humidity:

| Relative humidity at 20° C. | Filtration time in sec. | Median Pore diameter in $\mu$ |
|---|---|---|
| 50 | 60–80 | about 0.4 |
| 60 | 40–50 | about 0.5 |
| 70 | 25–30 | about 0.6 |

The influence of the air temperature upon the degree of porosity is within limits less recognizable than the influence of the relative humidity. It is for instance possible to produce coarse structures within the limit of the conventional room temperatures of 20° C. to 30° C. Upon raising this range to the range of 30° C. to 40° C. undesirable irregularities in the structure are increasingly experienced as well as a lack of capacity of penetration is found in the resulting filter material.

It is undoubtedly quite apparent from the description set forth above in what manner and to what extent the manufacture of membrane filters on the basis of cellulose esters is dependent upon colloid chemical factors and in what manner the conditions in the manufacture of membrane filters are distinguished over those processes which are aimed at the manufacture of photofilms or celluloid foils. In the manufacture of membrane filters the obtention of certain physical characteristics, particularly the formation of a certain pore structure is of greatest essence.

While I have disclosed several embodiments of the present invention, it is to be understood that these embodiments are given by example only and not in a limiting sense, the scope of the present invention being determined by the objects and the claims.

I claim:

1. A process of making a porous diaphragm filter comprising the steps of continuously coating a moving endless belt with a solution of 3% to 15% of a cellulose ester selected from the group consisting of cellulose nitrate and cellulose acetate dissolved in an organic solvent containing light volatile components selected from the group consisting of ethyl acetate, amyl acetate, acetone, methylethyl ketone, ether, ketone, ester, and heavier volatile components selected from the group consisting of ethyl alcohol, butyl alcohol, amyl alcohol and isobutyl alcohol to form a coating layer, feeding said belt coated with said solution into a chamber maintained at a relative humidity of from 50% to 70% and a temperature of from 20° C. to 40° C. in order to obtain a gelatinization and a vaporization of said light volatile components of said solution; feeding said belt through a bath selected from the group consisting of pure water, an aqueous solution of alcohols, an aqueous solution of esters and a glycerin solution at a temperature of from 20° C. to 40° C. in order to solidify said coating layer on said diaphragm filter and to remove said heavier volatile components of said solution; and separating the formed porous diaphragm filter from said belt after emerging from said bath.

2. The process, as set forth in claim 1, which includes the step of adding glycerin to said cellulose ester and said organic solvents.

3. The process, as set forth in claim 1, which includes the step of adding a small quantity of water to said solution of cellulose esters and said organic solvents.

4. The process, as set forth in claim 1, wherein said gelatinization and vaporization step of said readily volatile solvent is carried out in an atmosphere flowing counter to the movement of said belt.

5. The process, as set forth in claim 1, wherein the liquid in said chamber moves in counter-current relationship to the movement of said belt, in order to maintain a constant diffusion gradient.

6. A process of making a porous diaphragm filter comprising the steps of continuously coating a moving endless belt with a solution of 3% to 15% of cellulose acetate dissolved in methylene chloride and heavy components selected from the group consisting of ethyl alcohol, butyl alcohol, amyl alcohol and isobutyl alcohol; feeding said coated belt into a chamber maintained at a relative humidity of from 50% to 70% and a temperature of from 20° C. to 40° C. in order to obtain a gelatinization and a vaporization of said readily volatile components of said solution to form a coating layer, feeding said belt through a bath selected from the group consisting of pure water, an aqueous solution of alcohols, an aqueous solution of esters, and a glycerin solution at a temperature of from 20° C. to 40° C. in order to solidify said coating layer on said diaphragm filter and to remove said heavy volatile components of said solution; and separating the formed porous diaphragm filter from said belt after emerging from said bath.

References Cited in the file of this patent

UNITED STATES PATENTS

| | | |
|---|---|---|
| 1,351,652 | Jarvis | Aug. 31, 1920 |
| 1,421,341 | Zsigmondy | June 27, 1922 |
| 1,576,523 | Looney | Mar. 16, 1926 |
| 1,845,377 | Wells | Feb. 16, 1932 |
| 1,878,559 | Wells et al. | Sept. 20, 1932 |
| 2,045,370 | Roberts et al. | June 23, 1936 |
| 2,203,596 | Konig | June 4, 1940 |
| 2,218,146 | Fothergill | Oct. 15, 1940 |
| 2,245,429 | Carver et al. | June 10, 1941 |
| 2,253,157 | Weingand et al. | Aug. 19, 1941 |
| 2,308,949 | Alderfer | Jan. 19, 1943 |
| 2,714,745 | Kenyon | Aug. 9, 1955 |